United States Patent
Kramer et al.

(10) Patent No.: US 12,038,177 B1
(45) Date of Patent: Jul. 16, 2024

(54) FUEL INJECTOR ASSEMBLY FOR GAS TURBINE ENGINE WITH FUEL, AIR AND STEAM INJECTION

(71) Applicant: Raytheon Technologies Corporation, Farmington, CT (US)

(72) Inventors: Stephen K. Kramer, Cromwell, CT (US); Zhongtao Dai, West Hartford, CT (US); Lance L Smith, West Hartford, CT (US); Gregory Boardman, Owens Cross Roads, AL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,436

(22) Filed: Mar. 14, 2023

(51) Int. Cl.
| | | |
|---|---|---|
| *F23R 3/14* | (2006.01) | |
| *F02C 3/20* | (2006.01) | |
| *F02C 3/30* | (2006.01) | |
| *F23R 3/28* | (2006.01) | |

(52) U.S. Cl.
CPC ............... *F23R 3/14* (2013.01); *F02C 3/20* (2013.01); *F02C 3/30* (2013.01); *F23R 3/283* (2013.01)

(58) Field of Classification Search
CPC .... F23R 3/14; F23R 3/28; F23R 3/283; F23R 3/286; F23R 3/34; F23R 3/343; F23R 3/346; F23R 3/36; F02C 3/20; F02C 3/30
See application file for complete search history.

(56) References Cited

U.S. PATENT DOCUMENTS

| | | | | |
|---|---|---|---|---|
| 5,054,279 A | * | 10/1991 | Hines | F01K 21/047 60/39.5 |
| 5,361,578 A | * | 11/1994 | Donlan | F23L 7/005 60/742 |
| 5,784,875 A | * | 7/1998 | Statler | F23R 3/12 60/39.463 |
| 7,536,862 B2 | | 5/2009 | Held | |
| 7,934,381 B2 | * | 5/2011 | Eroglu | F23L 7/00 60/737 |
| 8,256,226 B2 | | 9/2012 | Khan | |
| 8,607,572 B2 | | 12/2013 | Koizumi | |
| 2004/0265136 A1 | * | 12/2004 | Martling | F23D 17/002 417/572 |
| 2007/0003897 A1 | * | 1/2007 | Koizumi | F23R 3/28 431/354 |
| 2007/0044477 A1 | * | 3/2007 | Held | F23R 3/36 60/776 |
| 2007/0277528 A1 | * | 12/2007 | Homitz | F23D 14/08 60/737 |

(Continued)

*Primary Examiner* — William H Rodriguez
(74) *Attorney, Agent, or Firm* — Getz Balich LLC

(57) ABSTRACT

An assembly is provided for a turbine engine. This assembly includes a fuel injector assembly, and the fuel injector assembly includes a fuel passage, an air passage and a steam passage. The fuel injector assembly is configured to direct fuel out of the fuel passage along an axis into a volume as a fuel flow. The fuel injector assembly is configured to direct air out of the air passage along the axis into the volume as an air flow, where the air flow circumscribes the fuel flow. The fuel injector assembly is configured to direct steam out of the steam passage along the axis into the volume as a steam flow, where the steam flow circumscribes the fuel flow and provides a radial buffer between the fuel flow and the air flow.

15 Claims, 12 Drawing Sheets

(56) References Cited

U.S. PATENT DOCUMENTS

| | | | |
|---|---|---|---|
| 2010/0101204 A1* | 4/2010 | Berry | F23R 3/28 |
| | | | 60/737 |
| 2012/0174590 A1* | 7/2012 | Krull | F23R 3/286 |
| | | | 73/112.01 |
| 2012/0181355 A1* | 7/2012 | Corry | F23R 3/28 |
| | | | 239/436 |
| 2013/0152593 A1* | 6/2013 | Oskam | F23R 3/28 |
| | | | 60/742 |
| 2022/0205393 A1 | 6/2022 | Brightwell | |
| 2022/0268444 A1 | 8/2022 | D'Agostini | |

* cited by examiner

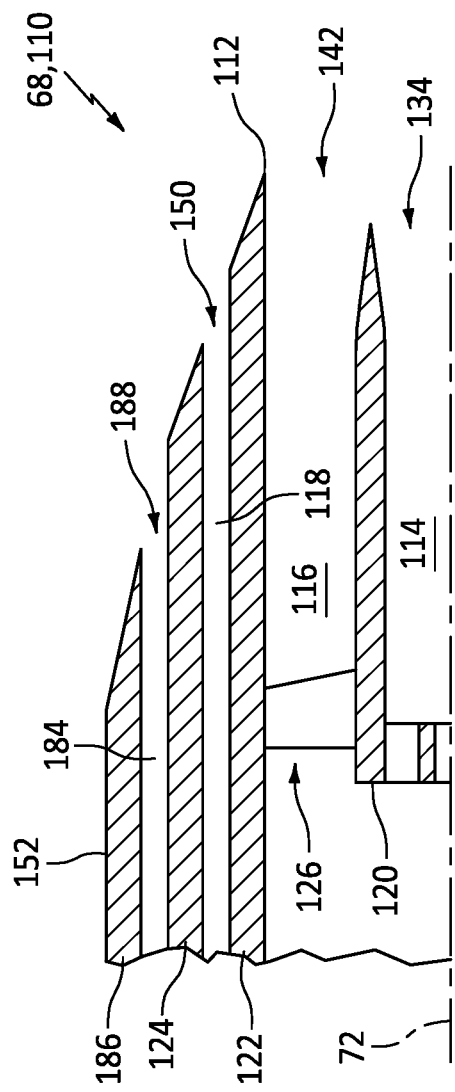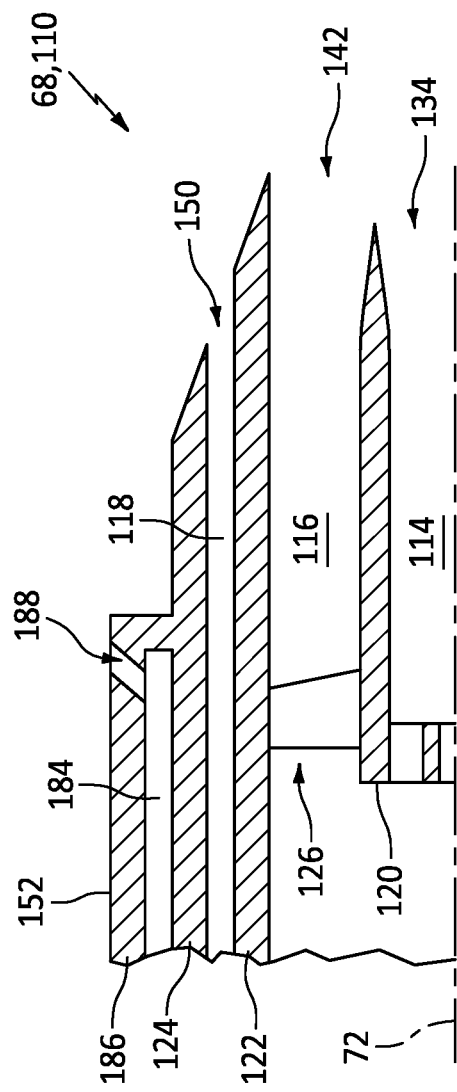

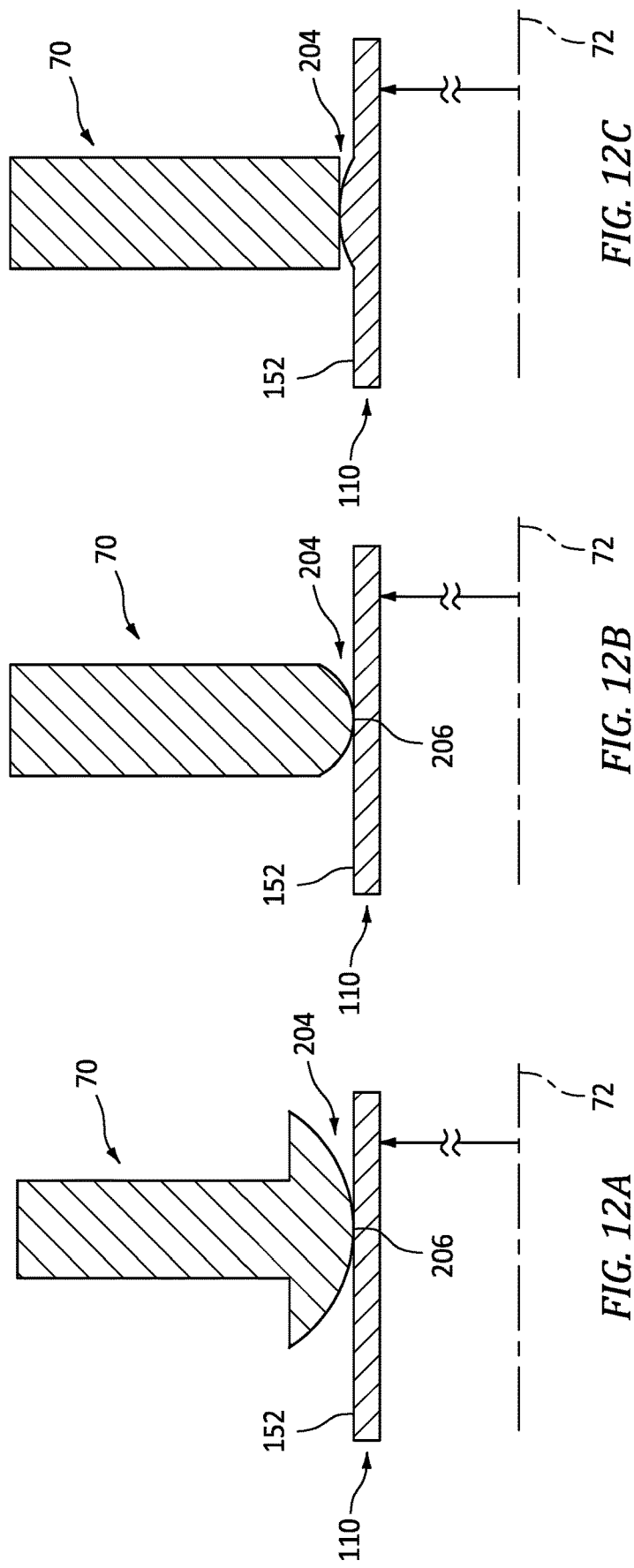

FUEL INJECTOR ASSEMBLY FOR GAS TURBINE ENGINE WITH FUEL, AIR AND STEAM INJECTION

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a fuel injector assembly, and the fuel injector assembly includes a fuel passage, an air passage and a steam passage. The fuel injector assembly is configured to direct fuel out of the fuel passage along an axis into a volume as a fuel flow. The fuel injector assembly is configured to direct air out of the air passage along the axis into the volume as an air flow, where the air flow circumscribes the fuel flow. The fuel injector assembly is configured to direct steam out of the steam passage along the axis into the volume as a steam flow, where the steam flow circumscribes the fuel flow and provides a radial buffer between the fuel flow and the air flow.

According to another aspect of the present disclosure, another assembly is provided for a turbine engine. This assembly includes an air swirler structure and a fuel nozzle. The air swirler structure forms an outer peripheral boundary of an air passage. The air passage is fluidly coupled with a volume through an annular air outlet from the air passage. The fuel nozzle projects axially along an axis into the air swirler structure. The fuel nozzle includes a first nozzle wall and a second nozzle wall. The first nozzle wall forms an outer peripheral boundary of a fuel passage and an inner peripheral boundary of a steam passage. The fuel passage is fluidly coupled with the volume through a fuel outlet from the fuel passage. The steam passage is fluidly coupled with the volume through a steam outlet from the steam passage. The second nozzle wall forms an outer peripheral boundary of the steam passage and an inner peripheral boundary of the air passage.

According to still another aspect of the present disclosure, an apparatus is provided for a turbine engine. This apparatus includes a fuel nozzle, and the fuel nozzle includes a fuel passage, a steam passage, a first nozzle wall and a second nozzle wall. The first nozzle wall extends circumferentially around an axis. The first nozzle wall extends axially along the axis to a first wall end. The first nozzle wall forms an outer peripheral boundary of the fuel passage with a fuel outlet from the fuel passage disposed at the first wall end. The first nozzle wall forms an inner peripheral boundary of the steam passage. The second nozzle wall extends circumferentially around the axis. The second nozzle wall extends axially along the axis to a second wall end. The second nozzle wall forms an outer peripheral boundary of the steam passage with an annular steam outlet from the steam passage disposed at the second wall end. The second wall end is axially recessed from the first wall end along the axis.

The fuel injector assembly may be configured such that the steam flow directed into the volume is radially adjacent the fuel flow directed into the volume.

The fuel injector assembly may be configured such that the steam flow directed into the volume is radially adjacent the air flow directed into the volume.

The fuel injector assembly may be configured such that the steam flow directed into the volume radially borders the fuel flow and the air flow directed into the volume.

The steam passage may be a first steam passage, and the fuel injector assembly may also include a second steam passage. The steam flow may be a first steam flow, and the fuel injector assembly may be configured to direct additional steam out of the second steam passage along the axis into the volume as a second steam flow. The second steam flow may be radially between the first steam flow and the air flow.

The second steam flow may circumscribe the first steam flow.

The first steam passage may extend axially within the fuel injector assembly to a first steam outlet. The second steam passage may extend axially within the fuel injector assembly to a second steam outlet that is axially offset from and upstream of the first steam outlet.

The steam passage may be a first steam passage, and the fuel injector assembly may also include a second steam passage. The fuel injector assembly may be configured to direct additional steam out of the second steam passage into the air upstream of the volume, and the additional steam may be directed out of the air passage into the volume with the air.

The fuel injector assembly may also include an air swirler structure and a fuel nozzle mated with and projecting axially into the air swirler structure. The air passage may be formed by the air swirler structure and the fuel nozzle. The fuel passage and the steam passage may be formed within the fuel nozzle.

The volume may include an inner passage within the air swirler structure downstream of a tip of the fuel nozzle.

The fuel injector assembly may also include a first nozzle wall and a second nozzle wall. The first nozzle wall may extend circumferentially around and axially along the axis. The first nozzle wall may form an outer peripheral boundary of the fuel passage and an inner peripheral boundary of the steam passage. The second nozzle wall may extend circumferentially around and axially along the first nozzle wall. The second nozzle wall may form an outer peripheral boundary of the steam passage.

The second nozzle wall may form an inner peripheral boundary of the air passage.

The steam passage may be a first steam passage, and the fuel injector assembly may include a second steam passage and a third nozzle wall. The second nozzle wall may form an inner peripheral boundary of the second steam passage. The third nozzle wall may extend circumferentially around and axially along the second nozzle wall. The third nozzle wall may form an outer peripheral boundary of the second steam passage and an inner peripheral boundary of the air passage.

The first nozzle wall may project axially along the axis to a first wall end. A fuel outlet from the fuel passage may be disposed at the first wall end. The second nozzle wall may project axially along the axis to a second wall end. A steam outlet from the steam passage may be disposed at the second wall end. The first wall end may be located axially upstream of the second wall end.

The first nozzle wall may project axially along the axis to a first wall end. A fuel outlet from the fuel passage may be disposed at the first wall end. The second nozzle wall may project axially along the axis to a second wall end. A steam outlet from the steam passage may be disposed at the second wall end. The first wall end may be located axially downstream of the second wall end.

A tapered portion of the first nozzle wall may radially taper as the first nozzle wall extends axially to the first wall end. The second wall end may be located axially upstream of the tapered portion of the first nozzle wall.

A tapered portion of the first nozzle wall may radially taper as the first nozzle wall extends axially to the first wall end. The second wall end may be located axially along the tapered portion of the first nozzle wall.

The fuel injector assembly may be configured to swirl the air within the air passage in a direction about the axis to provide the air flow. The fuel injector assembly may be configured to swirl the fuel within the fuel passage in the direction about the axis to provide the fuel flow.

The assembly may also include a fuel source, a compressor section and a steam source. The fuel source may be configured to provide the fuel to the fuel injector assembly. The compressor section may be configured to provide the air to the fuel injector assembly. The steam source may be configured to provide the steam to the fuel injector assembly.

The fuel source may be configured as or otherwise include a hydrogen fuel source. The fuel may be or otherwise include hydrogen fuel.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 7A and 7B are partial side sectional illustrations of the injector nozzle with additional steam passages.

FIGS. 12A-C are partial side sectional illustrations of the fuel injector assembly with various interfaces between an injector mount and an outer nozzle wall.

DETAILED DESCRIPTION

Figure 1:
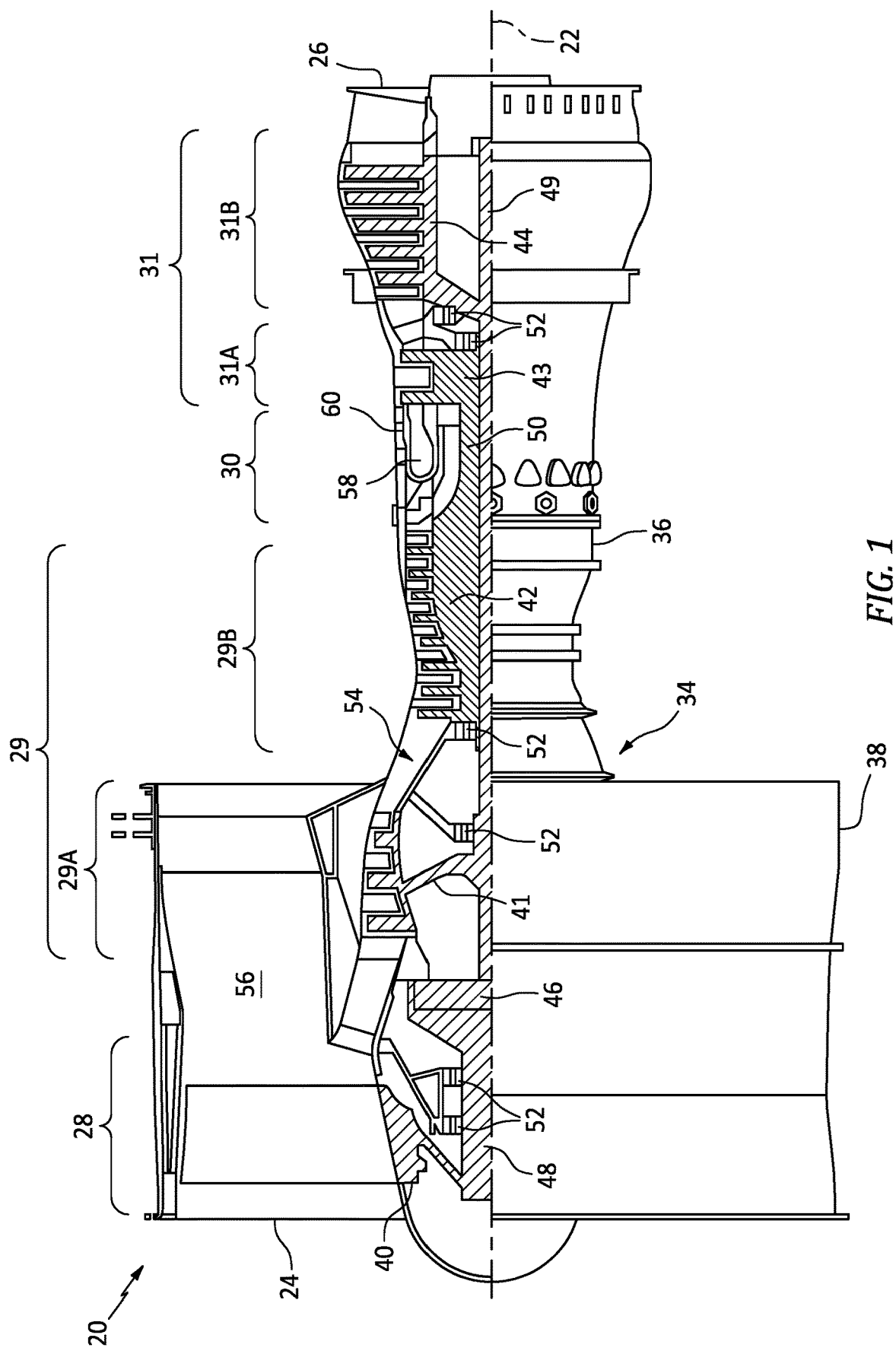
FIG. 1 is a side cutaway illustration of a geared turbine engine.

FIG. 1 is a side cutaway illustration of a geared gas turbine engine 20. This gas turbine engine 20 extends along an axial centerline 22 between an upstream airflow inlet 24 and a downstream airflow exhaust 26. The gas turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A, 29B, 30, 31A and 31B; e.g., a core of the gas turbine engine 20. The outer case 38 may house at least the fan section 28.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The engine shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During engine operation, air enters the gas turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, and bypasses the engine core. The air within the bypass flowpath 56 may be referred to as "bypass air".

The core air is compressed by the LPC rotor 41 and the HPC rotor 42 and directed into a (e.g., annular) combustion chamber 58 of a (e.g., annular) combustor 60 in the combustor section 30. Fuel is injected into the combustion chamber 58 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from an inlet to the core flowpath 54. The rotation of the LPT rotor 44 also drives rotation of the fan rotor 40, which propels bypass air through and out of the bypass flowpath 56. The propulsion of the bypass air may account for a majority of thrust generated by the gas turbine engine 20.

Figure 2:
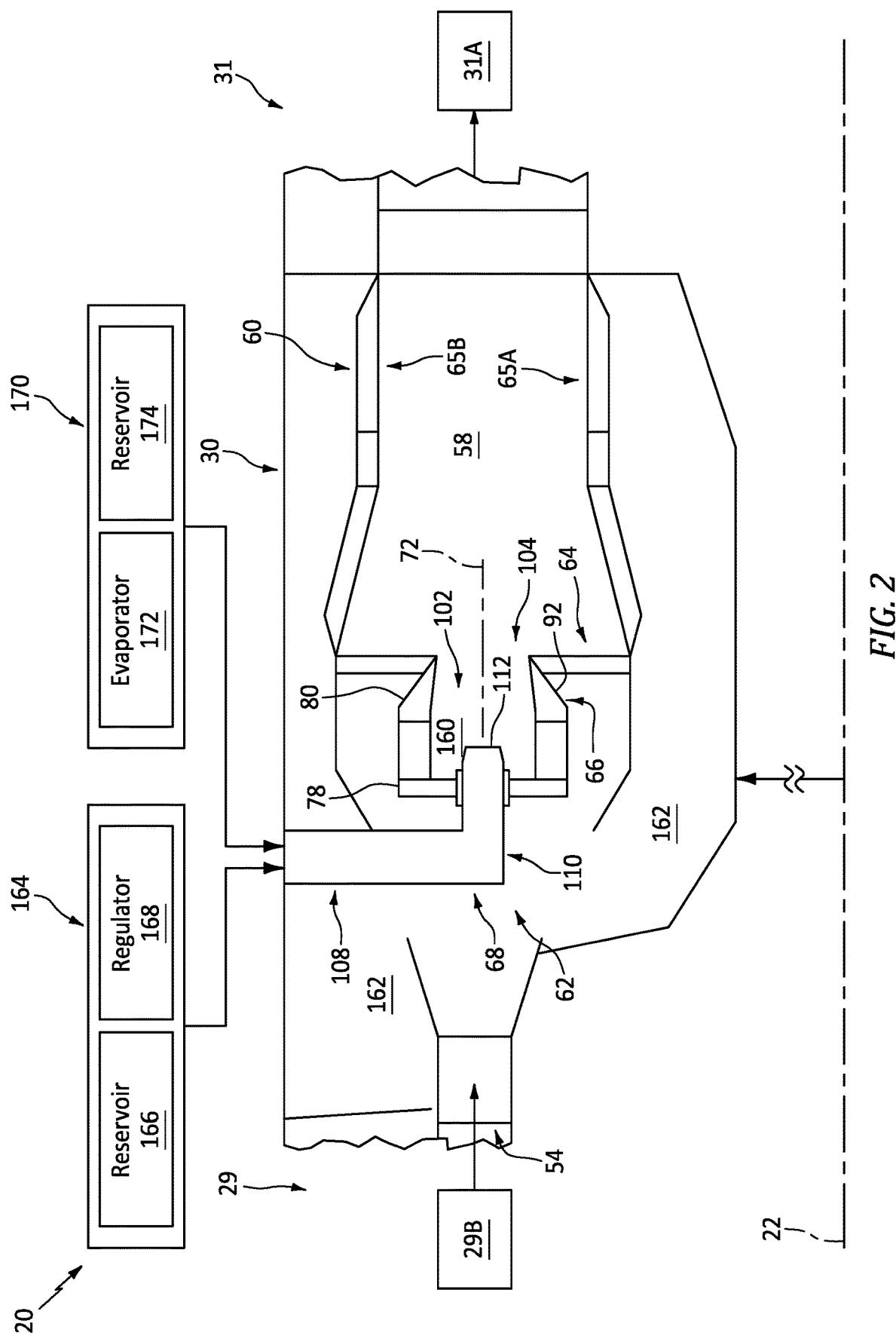
FIG. 2 is a partial schematic illustration of a combustor section between a compressor section and a turbine section.
Figure 3:
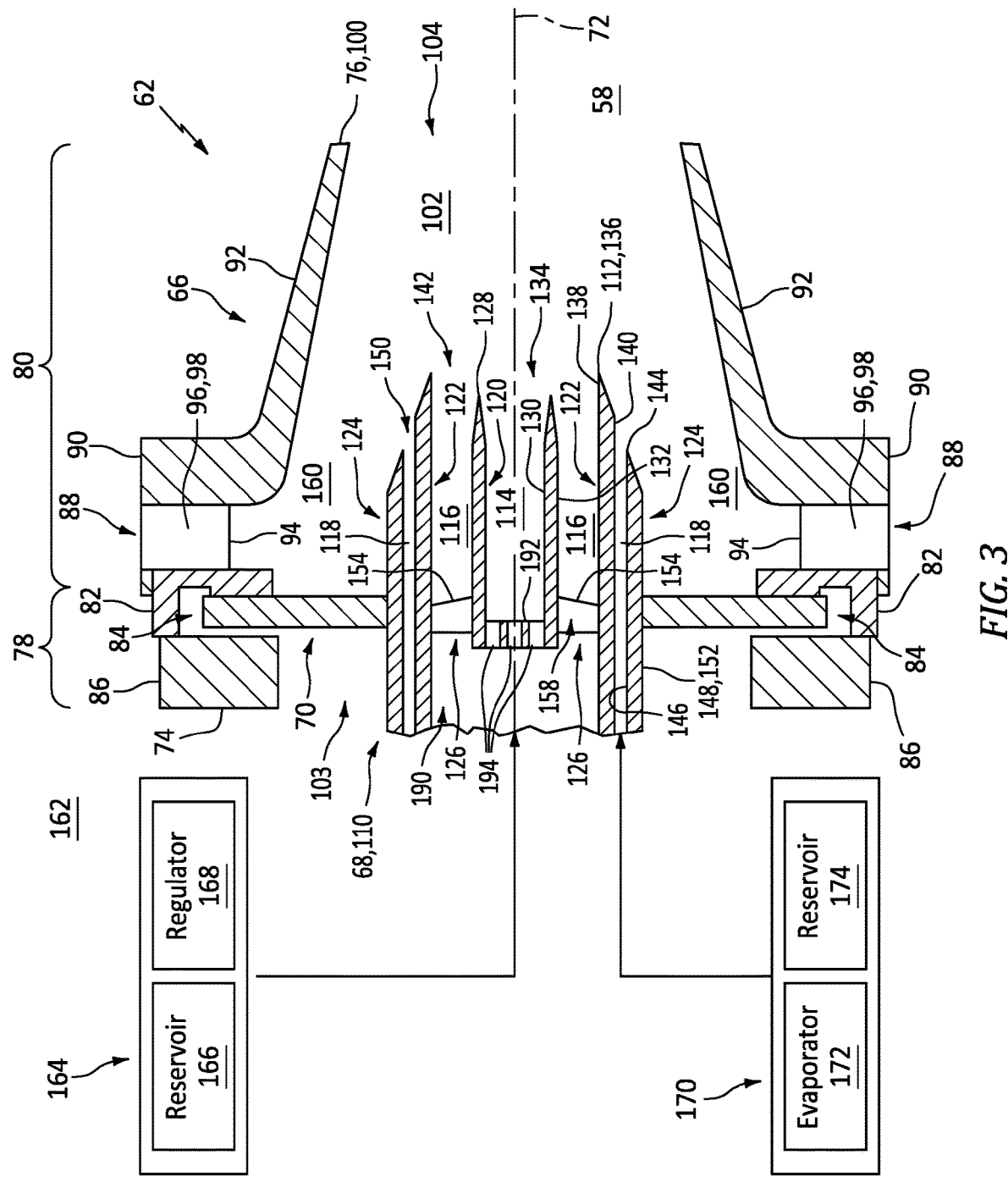
FIG. 3 is a partial side sectional illustration of the fuel injector assembly arranged with a fuel source and a steam source.

Referring to FIG. 2, the combustor section 30 includes a plurality of fuel injector assemblies 62 (one visible in FIG. 2) arranged circumferentially about the axial centerline 22 in a circular array. The fuel injector assemblies 62 are mounted to a (e.g., annular) bulkhead 64 of the combustor 60, which bulkhead 64 extends radially between and is connected to a (e.g., tubular) inner combustor wall 65A and a (e.g., tubular) outer combustor wall 65B. The fuel injector assemblies 62 are configured to direct a mixture of fuel and compressed air into the combustion chamber 58 for combustion. Each fuel injector assembly 62 of FIG. 2 includes an air swirler structure 66 and a fuel injector 68. Referring to FIG. 3, the fuel injector assembly 62 may also include an injector mount 70 coupling the fuel injector 68 to the swirler structure 66.

The swirler structure 66 extends circumferentially around an axis 72 (e.g., a centerline of the swirler structure 66) providing the swirler structure 66 with a full-hoop body. The swirler structure 66 extends axially along the axis 72 from an upstream end 74 of the swirler structure 66 to a downstream end 76 of the swirler structure 66. The swirler structure 66 may include a base section 78 and a swirler section 80.

The base section 78 is disposed at (e.g., on, adjacent or proximate) the swirler upstream end 74. This base section 78 may be configured as or otherwise include a first swirler wall 82; e.g., an annular upstream swirler wall. The base section 78 may also be configured to form a receptacle 84 (e.g., a slot, a channel, etc.) for the injector mount 70 at the swirler upstream end 74. The base section 78 of FIG. 3, for example, also includes a mounting plate 86 axially abutted against and attached to the first swirler wall 82. The receptacle 84 is formed at an inner periphery of the base section 78, axially between a (e.g., annular) surface of the first swirler wall 82 and a (e.g., annular) surface of the mounting plate 86. The receptacle 84 is configured to receive the injector mount 70, and (e.g., loosely) capture the injector mount 70 axially between the first swirler wall 82 and the mounting plate 86. This capturing of the injector mount 70 between the first swirler wall 82 and the mounting plate 86 may allow the injector mount 70 to radially float (e.g., shift) within the receptacle 84. This floating may in turn accommodate slight shifting between the swirler structure 66 and the fuel injector 68 during gas turbine engine operation. Of course, various other techniques are known in the art for arranging and/or securing an injector mount with an air swirler structure, and the present disclosure is not limited to any particular ones thereof. Furthermore, it is contemplated the injector mount 70 may alternatively be fixed to the swirler structure 66 where, for example, the swirler structure 66 is operable to shift relative to the combustor bulkhead 64.

The swirler section 80 includes an air swirler 88 and a second swirler wall 90; e.g., an annular downstream swirler wall. The swirler section 80 of FIG. 3 also includes a swirler guide wall 92; e.g., a tubular funnel wall.

Figure 4:
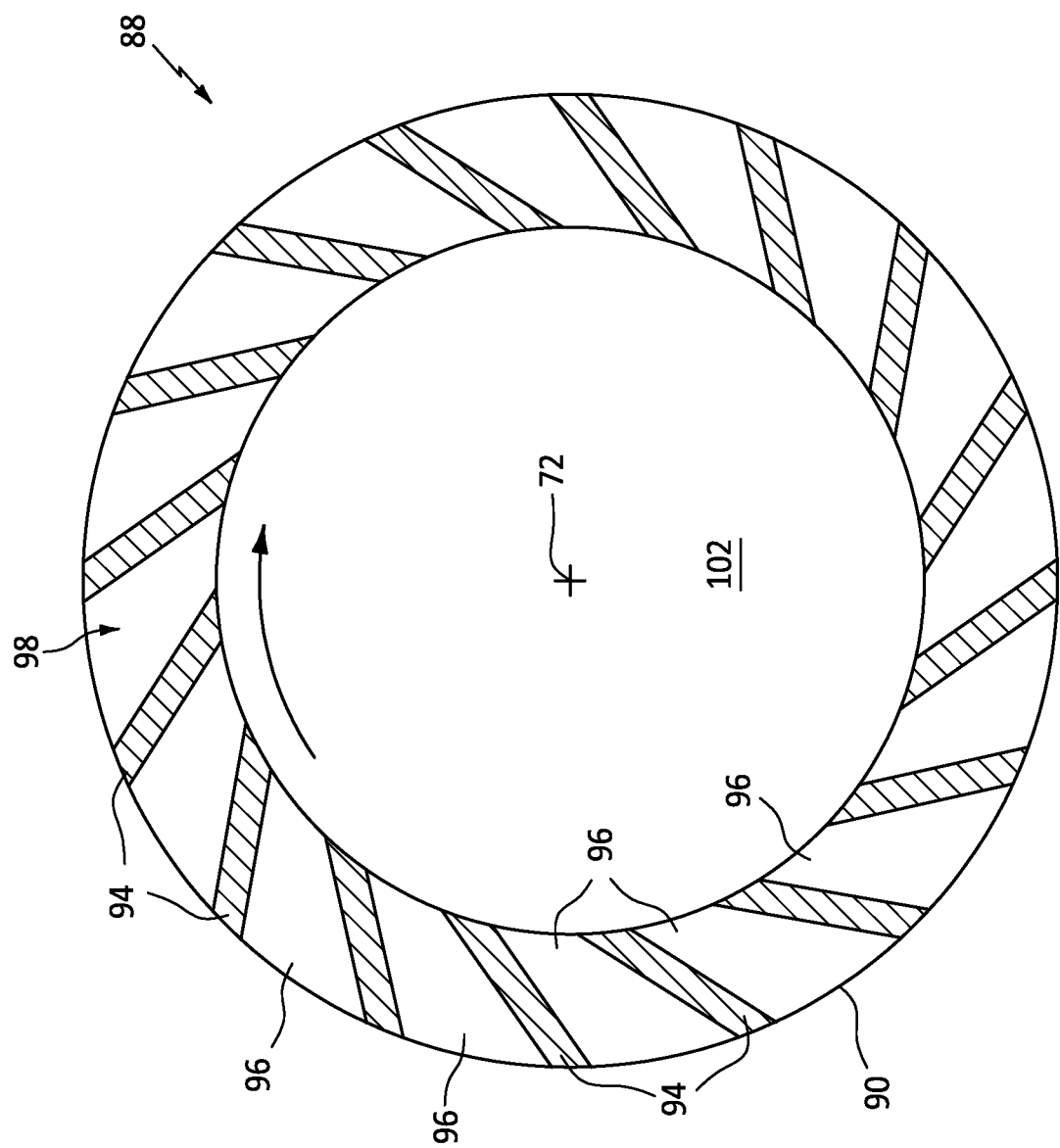
FIG. 4 is a cross-sectional illustration of an air swirler structure through an air swirler.

The air swirler 88 may be configured as a radial air swirler. The air swirler 88 of FIG. 3, for example, is arranged axially between and is connected to the first swirler wall 82 and the second swirler wall 90. The air swirler 88 of FIG. 4 includes a plurality of air swirler vanes 94. Each of these air swirler vanes 94 extends axially between and is connected to the first swirler wall 82 and the second swirler wall 90 (see FIG. 3). The air swirler vanes 94 are arranged circumferentially about the axis 72 in a circular array. Each of the air swirler vanes 94 is circumferentially separated from each circumferentially neighboring (e.g., adjacent) air swirler vane 94 by a respective air swirler channel 96; e.g., an air gap. Each air swirler channel 96 extends circumferentially between and to a respective circumferentially neighboring pair of the air swirler vanes 94. Each air swirler channel 96 extends axially between and to the first swirler wall 82 and the second swirler wall 90 (see FIG. 3). With this arrangement, the air swirler channels 96 collectively form an air swirler passage 98 radially through the air swirler 88, axially between the swirler walls 82 and 90 (see FIG. 3). The air swirler vanes 94/the air swirler channels 96 are configured such that air passing through and out of the air swirler passage 98 is directed in a first circumferential direction (e.g., a clockwise direction, or alternatively a counterclockwise direction) about the axis 72. In other words, the air swirler vanes 94/the air swirler channels 96 are operable to circumferentially swirl the air passing through the air swirler 88 in the first circumferential direction.

Referring to FIG. 3, the swirler guide wall 92 is disposed at the swirler downstream end 76. The swirler guide wall 92 of FIG. 3, for example, is connected to (and cantilevered from) the second swirler wall 90 at an inner end of the air swirler 88. This swirler guide wall 92 projects out from the second swirler wall 90 and extends axially along the axis 72 to a (e.g., downstream) distal end 100 of the swirler guide wall 92 at the swirler downstream end 76. As the swirler guide wall 92 extends towards (e.g., to) the swirler downstream end 76, the swirler guide wall 92 may (e.g., continuously or incrementally) radially taper inwards towards the axis 72. The swirler guide wall 92 may thereby have a tubular frustoconical geometry.

The swirler structure 66 of FIG. 3 includes an inner bore 102. This swirler bore 102 may extend axially along the axis 72 through the swirler structure 66 from an opening 103 at the swirler upstream end 74 to an inner swirler outlet 104 (e.g., an outlet orifice) at the swirler downstream end 76. An outer peripheral boundary of an upstream portion of the swirler bore 102 may be formed by and radially within the base section 78 and its first swirler wall 82. An outer peripheral boundary of a downstream portion of the swirler bore 102 may be formed by and radially within the swirler section 80 and its swirler guide wall 92. When the fuel injector assembly 62 is assembled, the opening 103 may be closed off/plugged by the respective fuel injector 68 and the injector mount 70.

Referring to FIG. 2, the swirler structure 66 may be mated with the combustor bulkhead 64. The swirler guide wall 92, for example, may project axially into or through a respective port in the combustor bulkhead 64. The swirler structure 66 may also be connected to the combustor bulkhead 64. For example, the swirler segment 80 (e.g., the second swirler wall 90 and/or the swirler guide wall 92 of FIG. 3) may be bonded (e.g., brazed or welded) and/or otherwise attached to the combustor bulkhead 64 and, more particularly, a shell of the combustor bulkhead 64. However, various other techniques are known in the art for mounting an air swirler structure to a combustor bulkhead (or various other combustor components), and the present disclosure is not limited to any particular ones thereof.

The fuel injector 68 of FIG. 2 includes a fuel injector stem 108 and a fuel injector nozzle 110. The injector stem 108 is configured to support and route fuel to the injector nozzle 110. The injector nozzle 110 is cantilevered from the injector stem 108. The injector nozzle 110 projects along the axis 72 (e.g., a centerline of the injector nozzle 110) partially into the swirler bore 102 of the swirler structure 66. A tip 112 of the injector nozzle 110 is thereby disposed within the swirler bore 102. Here, the nozzle tip 112 is axially spaced from the inner swirler outlet 104 by an axial distance along the axis 72.

Referring to FIG. 3, the injector nozzle 110 is configured with one or more fuel passages 114 and 116 and a steam passage 118. The injector nozzle 110 of FIG. 3, for example, includes an inner fuel passage wall 120 ("inner passage wall"), an outer fuel passage wall 122 ("outer passage wall") and a steam passage wall 124. This injector nozzle 110 may also include a fuel swirler 126.

The inner passage wall 120 extends axially along the axis 72 to a (e.g., downstream) distal end 128 of the inner passage wall 120. This inner passage wall end 128 of FIG. 3 is axially recessed from the nozzle tip 112 along the axis 72 by an axial distance; however, in other embodiments the inner passage wall end 128 may be axially aligned with or in close proximity to the nozzle tip 112 along the axis 72 (e.g., see FIGS. 6B and 6C). The inner passage wall 120 extends radially between and to an inner side 130 of the inner passage wall 120 and an outer side 132 of the inner passage wall 120. The inner passage wall inner side 130 of FIG. 3 at least partially or completely forms an outer peripheral boundary of the inner fuel passage 114; e.g., a central nozzle passage. The inner passage wall 120 may also form an inner fuel nozzle outlet 134 (e.g., an outlet orifice) of the inner fuel passage 114 at its distal end 128. The inner passage wall outer side 132 of FIG. 3 at least partially or completely forms an inner peripheral boundary of the outer fuel passage 116. The inner passage wall 120 extends circumferentially around the axis 72 providing the inner passage wall 120 with a full-hoop (e.g., tubular) body. With this arrangement, the inner fuel passage 114 may have a solid (e.g., non-annular) cross-sectional geometry axially along the inner passage wall 120 and to its inner fuel nozzle outlet 134.

The outer passage wall 122 extends axially along the axis 72 to a (e.g., downstream) distal end 136 of the outer passage wall 122. This outer passage wall end 136 is axially aligned with the nozzle tip 112 along the axis 72; however, in other embodiments the outer passage wall end 136 may be axially recessed form the nozzle tip 112 along the axis (e.g., see FIG. 6C). The outer passage wall 122 extends radially between and to an inner side 138 of the outer passage wall 122 and an outer side 140 of the outer passage wall 122. The outer passage wall inner side 138 of FIG. 3 at least partially or completely forms an outer peripheral boundary of the outer fuel passage 116. The outer passage wall 122 may also form an outer fuel nozzle outlet 142 (e.g., an outlet orifice) of the outer fuel passage 116 at its distal end 136/the nozzle tip 112. The outer passage wall outer side 140 of FIG. 3 at least partially or completely forms an inner peripheral boundary of the steam passage 118. The outer passage wall 122 extends circumferentially around the axis 72 providing the outer passage wall 122 with a full-hoop (e.g., tubular) body.

The outer passage wall 122 is spaced radially outward from the inner passage wall 120. At least a (e.g., upstream) portion of the outer passage wall 122 axially overlaps and circumscribes the inner passage wall 120. With this arrangement, the outer fuel passage 116 may have an annular cross-sectional geometry axially along the inner passage wall 120 and/or the outer passage wall 122. However, where the inner passage wall end 128 is axially recessed from the outer passage wall end 136 at the nozzle tip 112, a downstream portion of the outer fuel passage 116 may have a solid (e.g., non-annular) cross-sectional geometry from the inner passage wall end 128 to the outer fuel nozzle outlet 142.

The steam passage wall 124 extends axially along the axis 72 to a (e.g., downstream) distal end 144 of the steam passage wall 124. This steam passage wall end 144 is axially recessed from the nozzle tip 112 along the axis 72 by an axial distance; however, in other embodiments the steam passage wall end 144 may be axially aligned with the nozzle tip 112 along the axis 72 (e.g., see FIG. 6C). Here, the steam passage wall end 144 is also spaced axially forward of the inner passage wall end 128 along the axis 72; however, the present disclosure is not limited to such an exemplary arrangement. The steam passage wall 124 extends radially between and to an inner side 146 of the steam passage wall 124 and an outer side 148 of the steam passage wall 124. The steam passage wall inner side 146 of FIG. 3 at least partially or completely forms an outer peripheral boundary of the steam passage 118. The steam passage wall 124 may also form a steam nozzle outlet 150 (e.g., an outlet orifice) of the steam passage 118 at its distal end 144. The steam passage wall outer side 148 of FIG. 3 may provide a bearing surface 152 for mating with the injector mount 70. The injector nozzle 110 and its steam passage wall 124 of FIG. 3, for example, project through a bore of the injector mount 70, and the injector mount 70 may radially engage (e.g., contact) and may be axially slidable along the steam passage wall 124. Of course, in other embodiments, it is contemplated a sleeve or other intermediate element may be arranged between the steam passage wall 124 and the injector mount 70. Referring again to FIG. 3, the steam passage wall 124 extends circumferentially around the axis 72 providing the steam passage wall 124 with a full-hoop (e.g., tubular) body.

The steam passage wall 124 is spaced radially outward from the outer passage wall 122. At least a (e.g., upstream) portion of the steam passage wall 124 axially overlaps and circumscribes the outer passage wall 122. With this arrangement, the steam passage 118 may have an annular cross-sectional geometry axially along the outer passage wall 122 and/or the steam passage wall 124.

Figure 5:
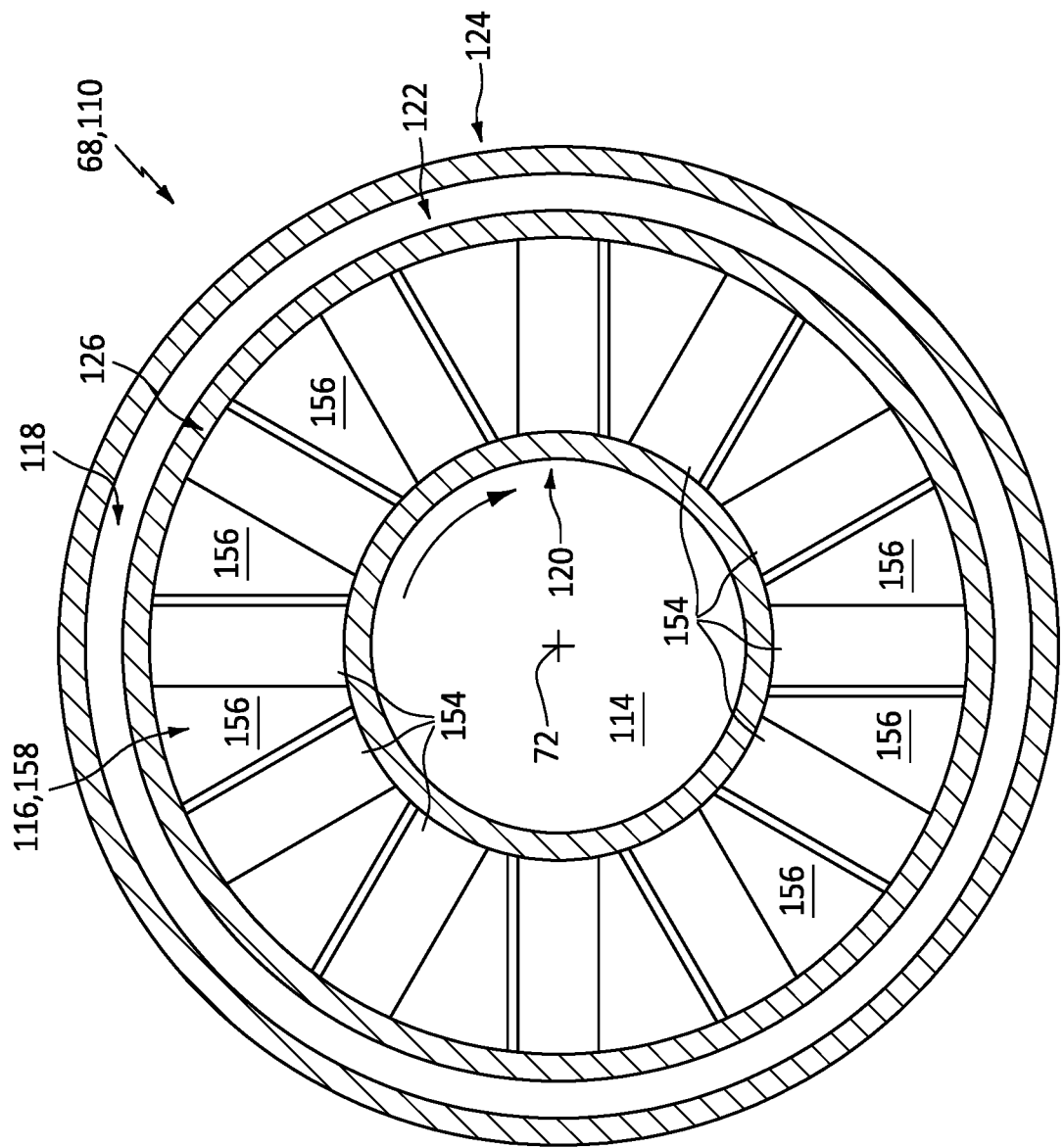
FIG. 5 is a cross-sectional illustration of an injector nozzle adjacent a fuel swirler.

The fuel swirler 126 may be configured as an axial fuel swirler. The fuel swirler 126 of FIG. 3, for example, is arranged radially between and is connected to the inner passage wall 120 and the outer passage wall 122. Referring to FIG. 5, the fuel swirler 126 includes a plurality of fuel swirler vanes 154. Each of these fuel swirler vanes 154 extends axially between and is connected to the inner passage wall 120 and the outer passage wall 122 (see also FIG. 3). The fuel swirler vanes 154 are arranged circumferentially about the axis 72 in a circular array. Each of the fuel swirler vanes 154 is circumferentially separated from each circumferentially neighboring (e.g., adjacent) fuel swirler vane 154 by a respective fuel swirler channel 156; e.g., a gap for flowing fuel. Each fuel swirler channel 156 extends circumferentially between and to a respective circumferentially neighboring pair of the fuel swirler vanes 154. Each fuel swirler channel 156 extends radially between and to the inner passage wall 120 and the outer passage wall 122. With this arrangement, the fuel swirler channels 156 collectively form a fuel swirler passage 158 axially through the fuel swirler 126, radially between the fuel passage walls 120 and 122. The fuel swirler vanes 154 and/or the fuel swirler channels 156 are configured such that fuel passing through and out of the fuel swirler passage 158 is directed in the first circumferential direction (e.g., the clockwise direction, or alternatively the counterclockwise direction) about the axis 72—the same direction as the air swirled by the air swirler 88 of FIG. 4. In other words, the fuel swirler vanes 154/the fuel swirler channels 156 are operable to circumferentially swirl the fuel passing through the fuel swirler 126 in the first circumferential direction.

Referring to FIG. 3, an air passage 160 within each fuel injector assembly 62 is fluidly coupled with an air source. This air passage 160 may be formed by the swirler structure 66 and the fuel injector 68 and, more particularly, the injector nozzle 110. The air passage 160 of FIG. 3, for example, includes the air swirler passage 98 and an annular portion of the swirler bore 102 radially between the swirler structure 66 and the injector nozzle 110 and its steam passage wall 124. Referring to FIG. 2, the air source may be configured as the compressor section 29 and, more particularly, the HPC section 29B. The air passage 160 of FIG. 2, for example, may receive the compressed core air from the HPC section 29B through a diffuser plenum 162 surrounding the combustor 60.

Referring to FIG. 3, one or both of the fuel passages 114 and 116 within each fuel injector assembly 62 is fluidly coupled with a fuel source 164. This fuel source 164 may include a fuel reservoir 166 and/or a fuel flow regulator 168; e.g., a valve and/or a pump. The fuel reservoir 166 is configured to store the fuel before, during and/or after turbine engine operation. The fuel reservoir 166, for example, may be configured as or otherwise include a tank, a cylinder, a pressure vessel, a bladder or any other type of fuel storage container. The fuel flow regulator 168 is configured to direct and/or meter a flow of the fuel from the fuel reservoir 166 to one or more or all of the fuel injectors 68 and, more particularly, to one or both of its fuel passages 114 and 116.

The fuel delivered by the fuel source 164 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel source 164, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel source 164 may be configured as a multi-fuel system operable to deliver, individually or in combination, multiple different fuels (e.g., a non-hydrocarbon fuel and a hydrocarbon fuel, etc.) for combustion within the combustion chamber 58. The turbine engine 20 of FIG. 1 may thereby be configured as a multi-fuel turbine engine; e.g., a dual-fuel turbine engine.

Referring to FIG. 3, the steam passage 118 within each fuel injector assembly 62 is fluidly coupled with a steam source 170. This steam source 170 is configured to provide steam to one or more or all of the fuel injectors 68 and, more particularly, to its steam passage 118. The steam source 170, for example, may be configured as or otherwise include an evaporator 172, which may be or otherwise include a fluid-to-fluid heat exchanger and/or an electrical heater. The evaporator 172 is configured to evaporate water into the steam during turbine engine operation. The water may be received from various sources. The steam source 170 of FIG. 3, for example, includes a water reservoir 174 fluidly coupled with and upstream of the evaporator 172. This water reservoir 174 is configured to store the water before, during and/or after turbine engine operation. Examples of the water reservoir 174 include, but are not limited to, a tank, a cylinder, a pressure vessel, a bladder or any other type of water storage container. Briefly, the water may be supplied to the water reservoir 174 by recovering water vapor from the combustion products flowing through the core flowpath 54 (see FIG. 1) and/or from another water source onboard or offboard an aircraft.

During operation, at the fuel injector assembly 62 of FIG. 3, air (e.g., the compressed core air) received from the air source is directed into the air passage 160 and its air swirler passage 98. This air flows radially through the air swirler passage 98 and into a downstream portion of the air passage 160. As the air passes through the air swirler 88 and its air swirler passage 98, the air is swirled in the first circumferential direction (see FIG. 4). The air directed through the air swirler 88 into the downstream portion of the air passage 160 is therefore (or otherwise includes) swirled air. This swirled air is directed axially out of the air passage 160, through a portion of the swirler bore 102 downstream of the injector nozzle 110 and its nozzle tip 112, and is discharged from the swirler structure 66 through the inner swirler outlet 104. The swirler structure 66 of FIG. 3 may thereby inject the swirled air as an annular air flow of the swirled air along the axis 72 into the combustion chamber 58.

Fuel received from the fuel source 164 is directed into the inner fuel passage 114. This inner passage fuel flows through the inner fuel passage 114 and is discharged from the injector nozzle 110 through the inner fuel nozzle outlet 134 (and the downstream portion of the outer fuel passage 116) into the downstream portion of the swirler bore 102. The injector nozzle 110 may thereby inject the inner passage fuel (e.g., without swirl) along the axis 72 into the combustion chamber 58 through the downstream portion of the swirler bore 102 as, for example, a solid stream (e.g., non-annular jet) of the inner passage fuel. The quantity and speed of this inner passage fuel may be tailored to reduce likelihood of flashback into the swirler structure 66 and/or the injector nozzle 110.

Additional fuel received from the fuel source 164 is directed into the outer fuel passage 116 and flows axially through the fuel swirler passage 158. As the outer passage fuel passes through the fuel swirler 126 and its fuel swirler passage 158, the fuel is swirled in the first circumferential direction (see FIG. 5). The outer passage fuel directed through and discharged from the fuel swirler 126 is therefore (or otherwise includes) swirled fuel. This swirled fuel is directed axially through a remainder of the outer fuel passage 116 and is discharged from the injector nozzle 110 through the outer fuel nozzle outlet 142. The injector nozzle 110 may thereby inject the swirled fuel as an annular fuel flow of the swirled fuel along the axis 72, through the downstream portion of the swirler bore 102, into the combustion chamber 58. Within at least one downstream volume (e.g., the downstream portion of the swirler bore 102 and/or the combustion chamber 58), the annular fuel flow may be radially outboard of and radially adjacent (and in contact with) the stream of the inner passage fuel. Here, the annular fuel flow circumscribes the stream of the inner passage fuel.

Steam received from the steam source 170 is directed into the steam passage 118. This steam flows through the steam passage 118 and is discharged from the injector nozzle 110 through the steam nozzle outlet 150 into the downstream portion of the swirler bore 102. The injector nozzle 110 may thereby inject the steam (e.g., without swirl) along the axis 72 into the combustion chamber 58 through the downstream portion of the swirler bore 102 as, for example, an annular steam flow. Within at least one downstream volume (e.g., the downstream portion of the swirler bore 102 and/or the combustion chamber 58), the annular steam flow may be radially outboard of and radially adjacent (and in contact with) the annular fuel flow. This annular steam flow may also be radially inboard of and radially adjacent (and in contact with) the annular air flow. Here, the annular steam flow circumscribes the annular fuel flow, and the annular air flow circumscribes the annular steam flow. The annular steam flow may thereby provide a radial buffer (e.g., steam sheath) between the annular fuel flow and the annular air flow.

By providing the buffer of the steam between the annular fuel flow and the annular air flow, mixing of the fuel with the air may be delayed further downstream into the combustion chamber 58. Turbulence induced mixing between the annular fuel flow and the annular air flow may also be reduced by swirling the air and the fuel in the common first circumferential direction (see FIGS. 4 and 5). The fuel and the air may thereby penetrate further downstream into the combustion chamber 58 before substantial mixing occurs. Delaying the mixing between the fuel and the air may reduce likelihood of flashback and/or flame holding on the injector nozzle 110. This may be particularly useful where the fuel is hydrogen fuel (e.g., gaseous hydrogen ($H_2$ gas)) or another such fuel with a relatively fast flame speed as compared to traditional hydrocarbon fuel such as kerosene and jet fuel. However, the swirling of the air and the fuel may still facilitate (e.g., substantially complete) mixing and burning of the fuel and the air within the combustion chamber 58.

Figure 6A:
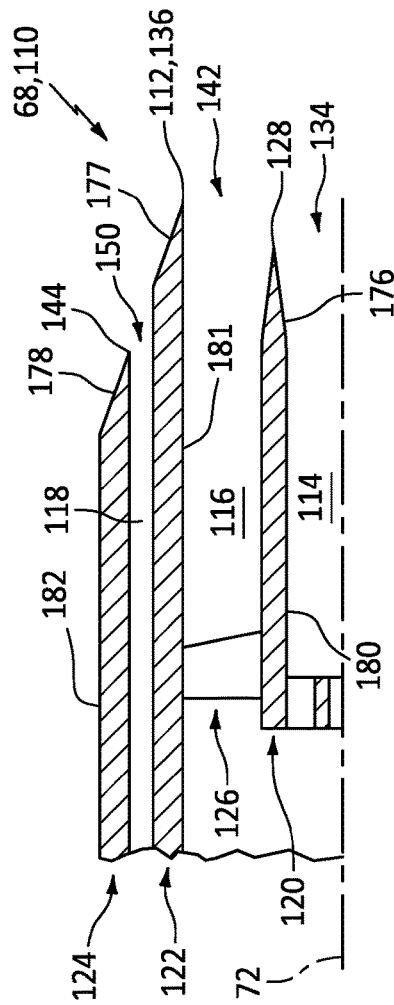
FIGS. 6A-C are partial side sectional illustrations of the injector nozzle with various internal passage arrangements.
Figure 6B:
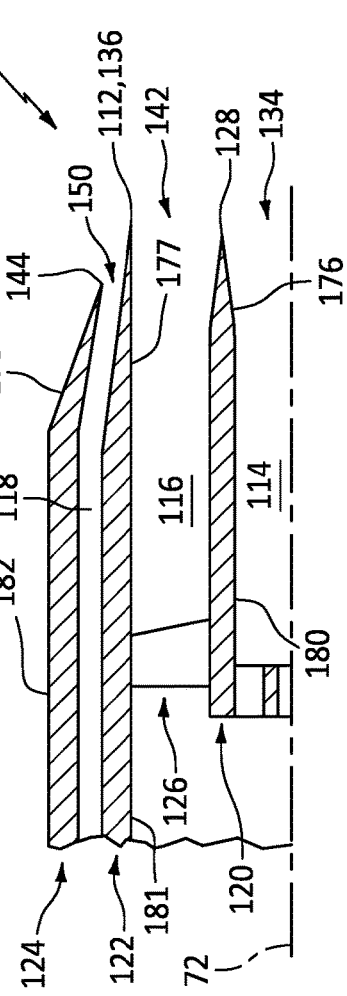
Figure 6C:
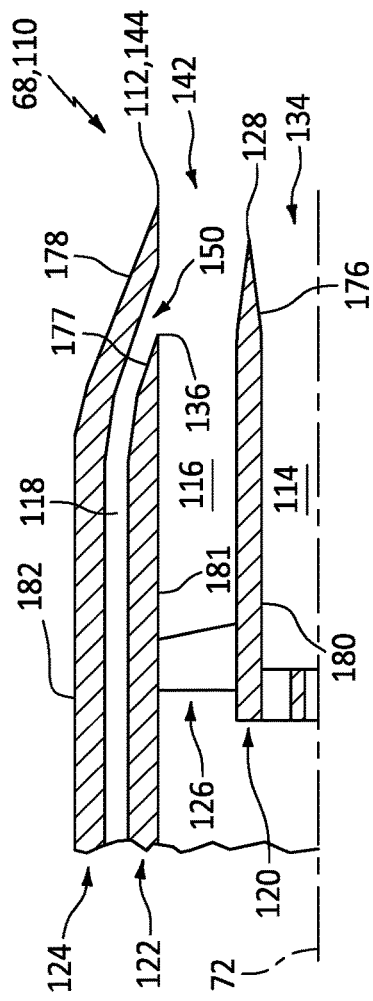

In some embodiments, referring to FIGS. 6A-C, one or more or all of the nozzle passage walls 120, 122 and/or 124 may each include a tapered edge. A downstream end portion 176, 177, 178 of each nozzle passage wall 120, 122, 124, for example, may be provided with a radial thickness that changes (e.g., decreases) as that downstream end portion 176, 177, 178 extends axially along the axis 72 to the respective nozzle passage wall end 128, 136, 144. However, a portion 180, 181, 182 of each nozzle passage wall 120, 122, 124 upstream of the downstream end portion 176, 177, 178 may have a uniform (e.g., constant) radial thickness. The present disclosure, however, is not limited to such an exemplary arrangement.

In some embodiments, referring to FIGS. 6A and 6B, the steam nozzle outlet 150 and/or the steam passage wall end 144 may be axially recessed from the outer fuel nozzle outlet 142 and/or the outer passage wall end 136. The steam nozzle outlet 150 and/or the steam passage wall end 144 of FIG. 6A, for example, is located axially upstream of the downstream end portion 177 of the outer passage wall 122. More particularly, the steam nozzle outlet 150 and/or the steam passage wall end 144 is axially aligned with the upstream portion 181 of the outer passage wall 122. With such an arrangement, some of the steam may mix with the air prior to sheathing the fuel, which may facilitate faster mixing between the fuel and the air. In another example, the steam nozzle outlet 150 and/or the steam passage wall end 144 of FIG. 6B is located axially along the downstream end portion 177 of the outer passage wall 122. With such an arrangement, mixing between the steam and the air as well as mixing between the air and the fuel may be delayed. In other embodiments however, referring to FIG. 6C, the outer fuel nozzle outlet 142 and/or the outer passage wall end 136 may be axially recessed from the steam nozzle outlet 150 and/or the steam passage wall end 144. With such an arrangement, the steam and the fuel are directed out of the outer fuel nozzle outlet 142 together.

In some embodiments, referring to FIGS. 7A and 7B, the injector nozzle 110 may configured with an additional (e.g., annular) steam passage 184. This injector nozzle 110, for example, may include an outer steam passage wall 186 which extends axially along and circumscribes the (now inner) steam passage wall 124. Here, the inner steam passage wall 124 may at least partially or completely form an inner peripheral boundary of the outer steam passage 184. The outer steam passage wall 186 may at least partially or completely form an outer peripheral boundary of the outer steam passage wall 186 as well as the bearing surface 152. The outer steam passage 184 extends axially within the injector nozzle 110, radially between the steam passage walls 124 and 186, to one or more outer steam nozzle outlets 188. In the embodiment of FIG. 7A, the injector nozzle 110 includes a single outer steam nozzle outlet 188 with an annular geometry. This outer steam nozzle outlet 188 is configured to provide another steam buffer (e.g., sheath) along the inner steam passage wall 124. In the embodiment of FIG. 7B, the injector nozzle 110 includes multiple of the outer steam nozzle outlets 188. These outer steam nozzle outlets 188 are arranged circumferentially about the axis 72 in an array; e.g., a circular array. Each of these outer steam nozzle outlets 188 may be configured to direct the steam at least partially or completely radially into the air flowing within the air passage 160 to introduce additional steam into the air.

Figure 8B:
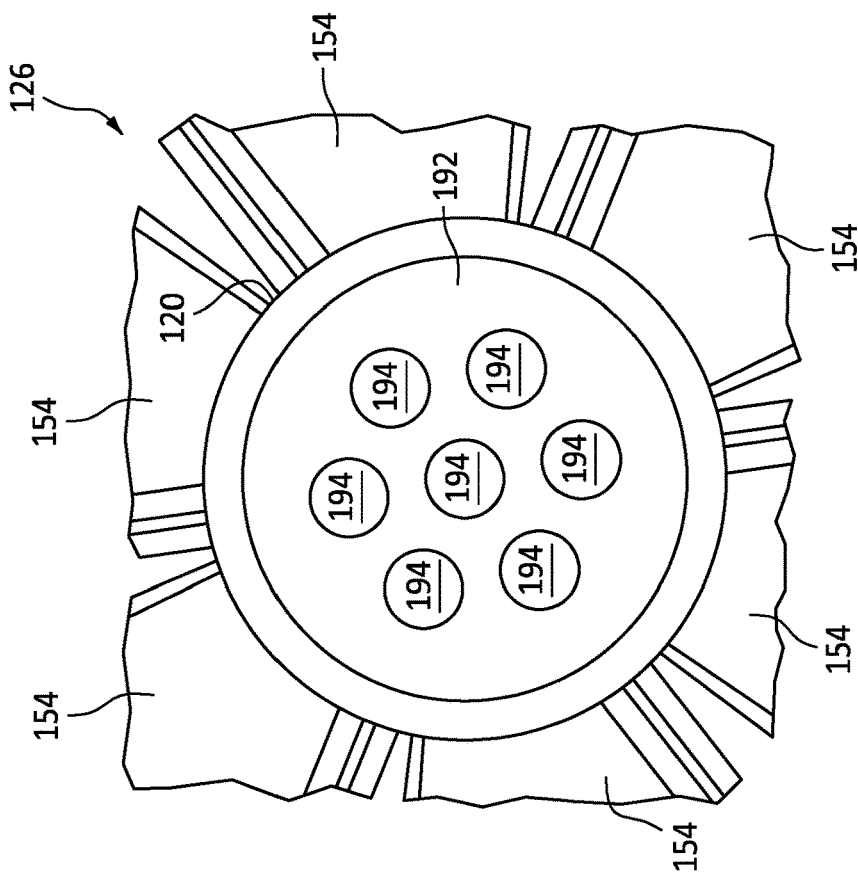
FIGS. 8A and 8B are perspective illustrations of a portion of the injector nozzle with various perforated endwall arrangements.
Figure 8A:
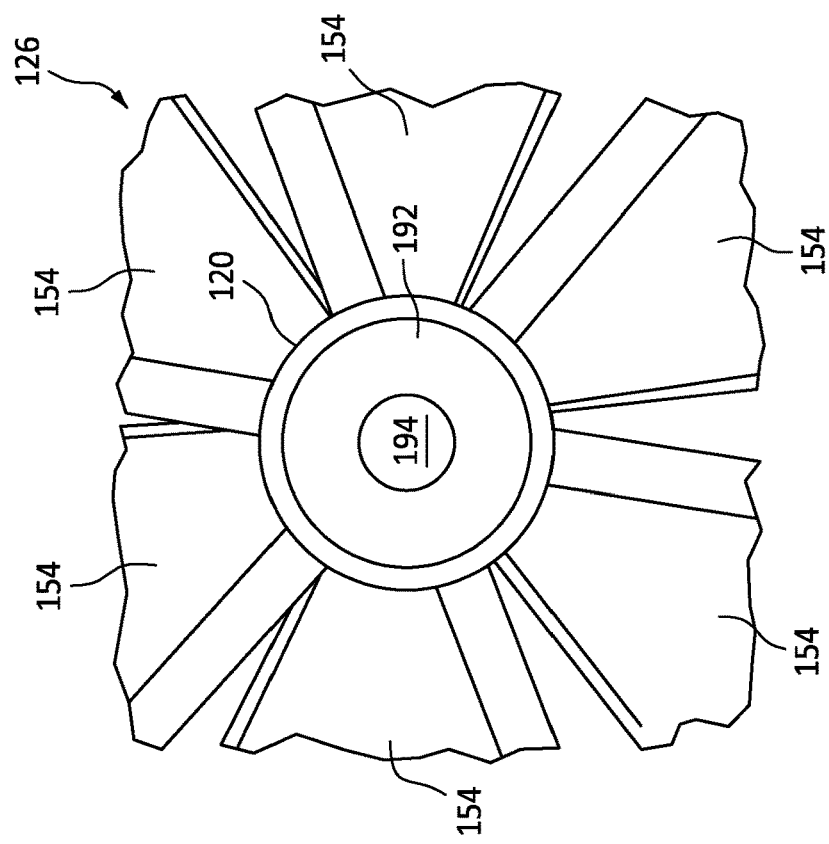

In some embodiments, referring to FIG. 3, the injector nozzle 110 may include a manifold passage 190; e.g., a fuel distribution passage. This manifold passage 190 is arranged upstream of and fluidly coupled with (e.g., in parallel) the inner fuel passage 114 and the outer fuel passage 116. The manifold passage 190 of FIG. 3, for example, is formed by an inner bore of the outer passage wall 122. This manifold passage 190 extends axially within the injector nozzle 110 to an annular inlet of the outer fuel passage 116. The manifold passage 190 also extends axially within the injector nozzle 110 to a center body endwall 192 capping off an inner bore of the inner passage wall 120. The endwall 192 of FIG. 3, in particular, is connected to the inner passage wall 120 at an upstream end of the inner fuel passage 114. This endwall 192 includes one or more perforations 194 (see also FIGS. 8A and 8B), where each perforation 194 extends axially through the endwall 192. The perforation(s) 194 in the endwall 192 may thereby fluidly couple the manifold passage 190 to the inner fuel passage 114. The quantity and size of the perforation(s) 194 may be selected to tailor the speed and quantity of the inner passage fuel injected by the injector nozzle 110. The endwall 192 and its perforation(s) 194 may thereby form a (e.g., fixed) flow regulator for the inner fuel passage 114. Of course, various other types and configurations of flow regulators are known in the art, and the present disclosure is not limited to any particular ones thereof.

Figure 9C:
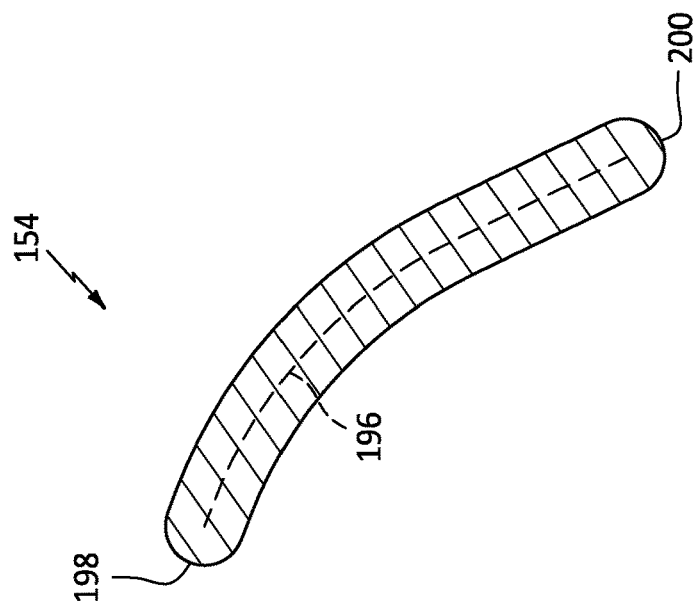
FIGS. 9A-C are plan view illustrations of various fuel swirler vane configurations.
Figure 9B:
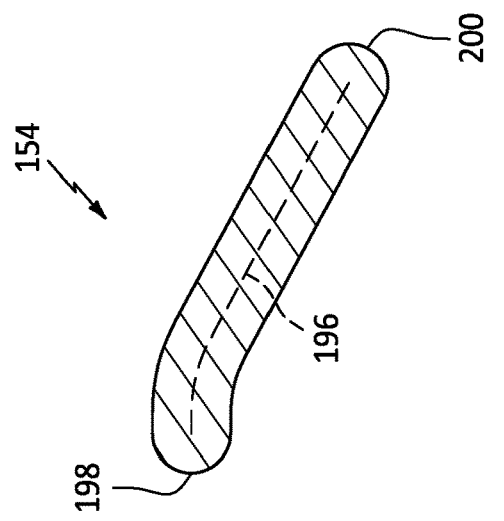
Figure 9A:
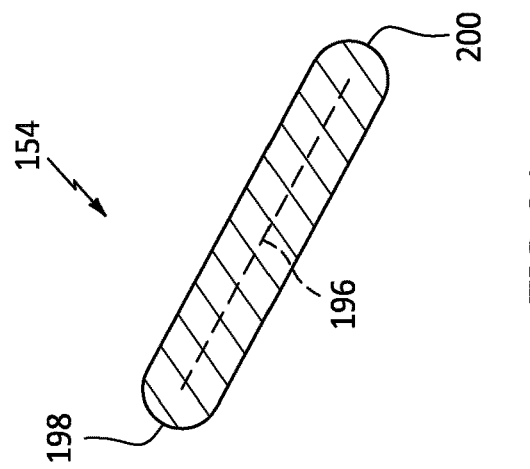
Figure 10:
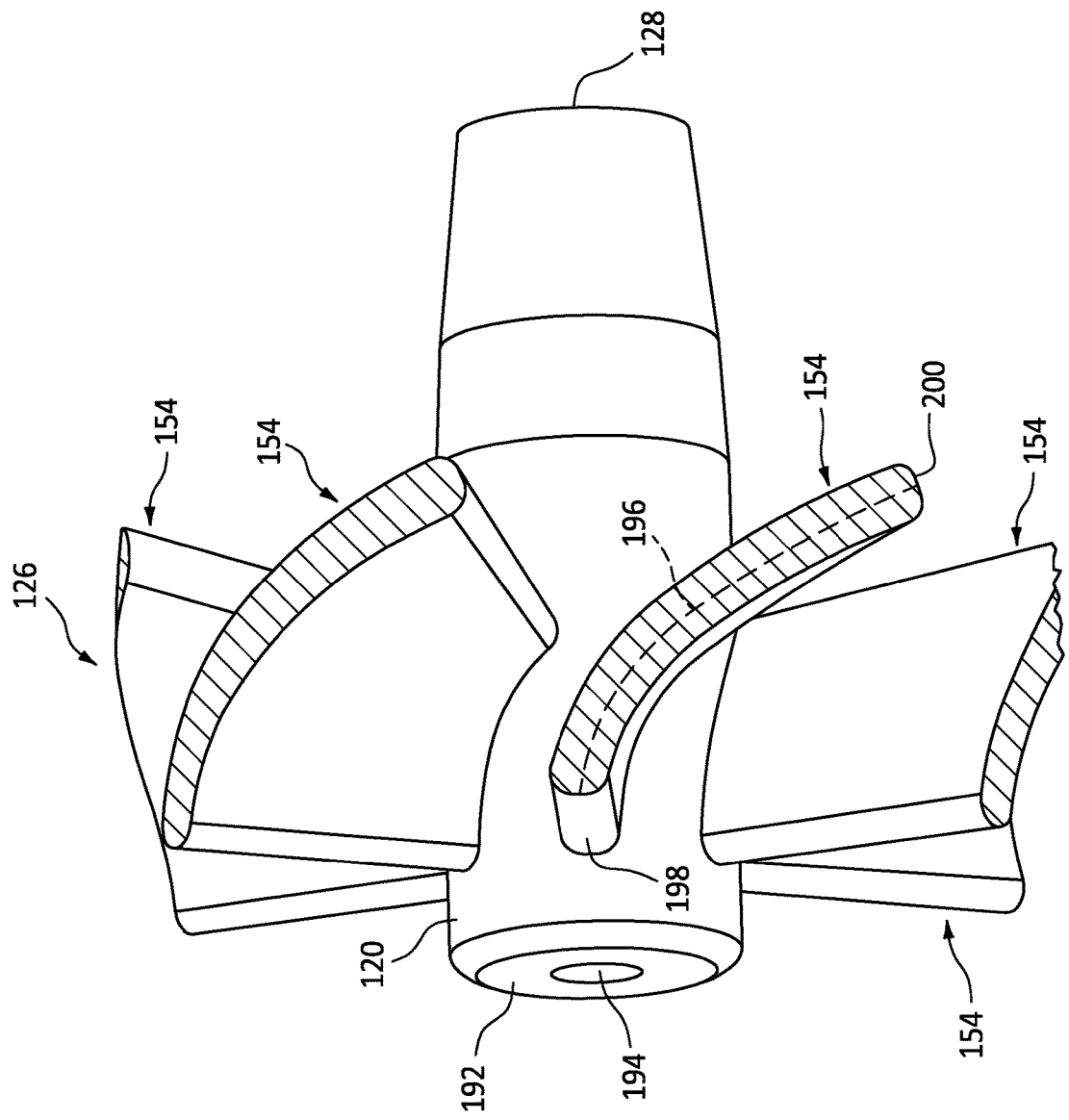
FIG. 10 is a perspective illustration of a portion of the injector nozzle with helical fuel swirler vanes.

Referring to FIGS. 9A-C, each of the fuel swirler vanes 154 has a camber line 196 extending from a leading edge 198 of that fuel swirler vane 154 to a trailing edge 200 of that fuel swirler vane 154. In some embodiments, referring to FIG. 9A, the camber line 196 of one, some or all of the fuel swirler vanes 154 may be straight from the leading edge 198 to the trailing edge 200. In other embodiments, referring to FIGS. 9B and 9C, the camber line 196 of one, some or all of the fuel swirler vanes 154 may be non-straight from the leading edge 198 to the trailing edge 200. For example, at least a portion or an entirety of the camber line 196 may be curved; e.g., arcuate, splined, etc. In some embodiments, referring to FIG. 10, one or more or all of the fuel swirler vanes 154 may also be configured as a helical vane.

In some embodiments, referring to FIG. 3, the swirler structure 66 may be configured with a single air swirler 88.

Figure 11:
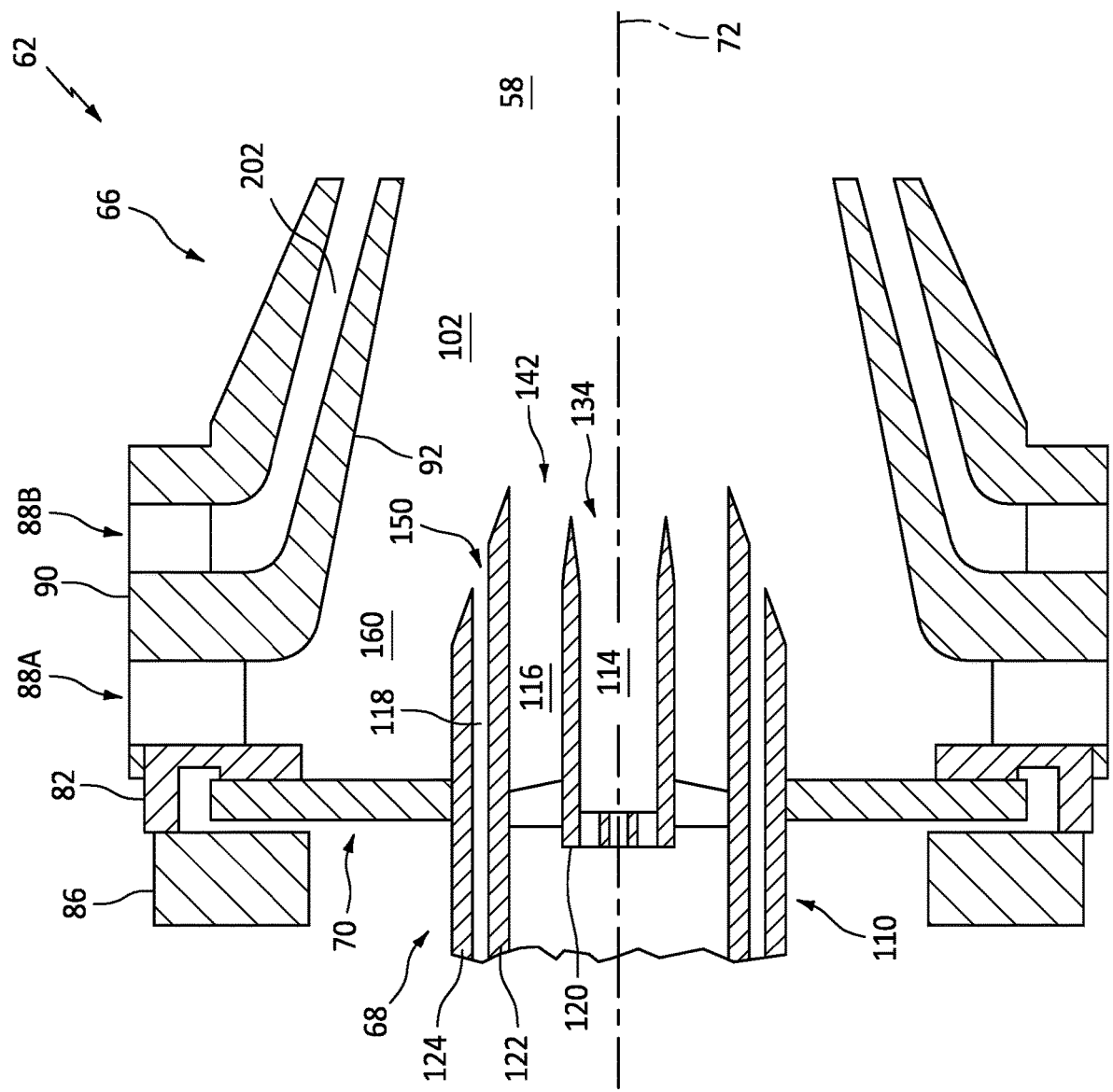
FIG. 11 is a partial side sectional illustration of the fuel injector assembly configured with an additional air swirler.

In other embodiments, referring to FIG. 11, the air swirler may alternatively be one of a plurality of air swirlers 88A and 88B (generally referred to as "88"). In the embodiment of FIG. 11, the second air swirler 88B may directed swirled air into an outer swirler passage 202 that circumscribes and extends along the swirler guide wall 92. It is contemplated this second air swirler 88B may swirl the air in the first circumferential direction (e.g., a common direction as the first air swirler 88A), or in a second circumferential direction about the axis 72 that is opposite the first circumferential direction.

In some embodiments, referring to FIGS. 12A and 12B, the injector mount 70 may be configured with a foot 204 to facilitate axial movement between the injector mount 70 and the bearing surface 152. This foot 204 may include a surface 206 with a curved (e.g., arcuate) or otherwise eased sectional geometry when viewed, for example, in a reference plane including or otherwise parallel with the axis 72. In other embodiments, referring to FIG. 12C, the foot 204 may be configured with the injector nozzle 110.

In some embodiments, referring to FIGS. 3 and 11, each air swirler 88 may be configured as a radial air swirler. However, in other embodiments, it is contemplated any one or more of the air swirlers 88 may alternatively be configured as an axial air swirler.

The fuel injector assembly(ies) 62 may be included in various turbine engines other than the one described above. The fuel injector assembly(ies) 62, for example, may be included in a geared turbine engine where a geartrain connects one or more shafts to one or more rotors in a fan section, a compressor section and/or any other engine section. Alternatively, the fuel injector assembly(ies) 62 may be included in a direct drive turbine engine configured without a geartrain; e.g., a direct drive turbine engine. The fuel injector assembly(ies) 62 may be included in a turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
 a fuel injector assembly including a fuel passage, an air passage and a steam passage;
 the fuel injector assembly configured to direct fuel out of the fuel passage along an axis into a volume as a fuel flow;
 the fuel injector assembly configured to direct air out of the air passage along the axis into the volume as an air flow, the air flow circumscribing the fuel flow;
 the fuel injector assembly configured to direct steam out of the steam passage along the axis into the volume as a steam flow, the steam flow circumscribing the fuel flow and providing a radial buffer between the fuel flow and the air flow;
 the fuel injector assembly further including a first nozzle wall and a second nozzle wall;
 the first nozzle wall extending circumferentially around and axially along the axis, the first nozzle wall forming an outer peripheral boundary of the fuel passage and an inner peripheral boundary of the steam passage, the first nozzle wall projecting axially along the axis to a first wall end, and a fuel outlet from the fuel passage disposed at the first wall end; and
 the second nozzle wall extending circumferentially around and axially along the first nozzle wall, the second nozzle wall forming an outer peripheral boundary of the steam passage, the second nozzle wall projecting axially along the axis to a second wall end, and a steam outlet from the steam passage disposed at the second wall end;
 wherein the first wall end is located axially downstream of the second wall end.

2. The assembly of claim 1, wherein the fuel injector assembly is configured such that the steam flow directed into the volume is radially adjacent the fuel flow directed into the volume.

3. The assembly of claim 1, wherein the fuel injector assembly is configured such that the steam flow directed into the volume is radially adjacent the air flow directed into the volume.

4. The assembly of claim 1, wherein
 the fuel injector assembly further includes an air swirler structure and a fuel nozzle mated with and projecting axially into the air swirler structure;
 the air passage is formed by the air swirler structure and the fuel nozzle; and
 the fuel passage and the steam passage are formed within the fuel nozzle.

5. The assembly of claim 4, wherein the volume comprises an inner passage within the air swirler structure downstream of a tip of the fuel nozzle.

6. The assembly of claim 1, wherein the second nozzle wall forms an inner peripheral boundary of the air passage.

7. The assembly of claim 1, wherein
 the steam passage is a first steam passage, and the fuel injector assembly further includes a second steam passage and a third nozzle wall;
 the second nozzle wall forms an inner peripheral boundary of the second steam passage; and
 the third nozzle wall extends circumferentially around and axially along the second nozzle wall, and the third nozzle wall forms an outer peripheral boundary of the second steam passage and an inner peripheral boundary of the air passage.

8. The assembly of claim 1, wherein
 a tapered portion of the first nozzle wall radially tapers as the first nozzle wall extends axially to the first wall end; and
 the second wall end is located axially upstream of the tapered portion of the first nozzle wall.

9. The assembly of claim 1, wherein
 a tapered portion of the first nozzle wall radially tapers as the first nozzle wall extends axially to the first wall end; and
 the second wall end is located axially along the tapered portion of the first nozzle wall.

10. The assembly of claim 1, further comprising:
a fuel source configured to provide the fuel to the fuel injector assembly;
a compressor section configured to provide the air to the fuel injector assembly; and
a steam source configured to provide the steam to the fuel injector assembly.

11. The assembly of claim 10, wherein the fuel source comprises a hydrogen fuel source, and the fuel comprises hydrogen fuel.

12. An assembly for a turbine engine, comprising:
a fuel injector assembly including a fuel passage, an air passage and a steam passage;
the fuel injector assembly configured to direct fuel out of the fuel passage along an axis into a volume as a fuel flow;
the fuel injector assembly configured to direct air out of the air passage along the axis into the volume as an air flow, the air flow circumscribing the fuel flow; and
the fuel injector assembly configured to direct steam out of the steam passage along the axis into the volume as a steam flow, the steam flow circumscribing the fuel flow and providing a radial buffer between the fuel flow and the air flow;
wherein the steam passage is a first steam passage, and the fuel injector assembly further includes a second steam passage; and
wherein the steam flow is a first steam flow, the fuel injector assembly is configured to direct additional steam out of the second steam passage along the axis into the volume as a second steam flow, and the second steam flow is radially between the first steam flow and the air flow.

13. The assembly of claim 12, wherein
the first steam passage extends axially within the fuel injector assembly to a first steam outlet; and
the second steam passage extends axially within the fuel injector assembly to a second steam outlet that is axially offset from and upstream of the first steam outlet.

14. An assembly for a turbine engine, comprising:
a fuel injector assembly including a fuel passage, an air passage and a steam passage;
the fuel injector assembly configured to direct fuel out of the fuel passage along an axis into a volume as a fuel flow;
the fuel injector assembly configured to direct air out of the air passage along the axis into the volume as an air flow, the air flow circumscribing the fuel flow; and
the fuel injector assembly configured to direct steam out of the steam passage along the axis into the volume as a steam flow, the steam flow circumscribing the fuel flow and providing a radial buffer between the fuel flow and the air flow;
wherein the steam passage is a first steam passage, and the fuel injector assembly further includes a second steam passage; and
wherein the fuel injector assembly is configured to direct additional steam out of the second steam passage into the air upstream of the volume, and the additional steam is directed out of the air passage into the volume with the air.

15. An assembly for a turbine engine, comprising:
a fuel injector assembly including a fuel passage, an air passage and a steam passage;
the fuel injector assembly configured to direct fuel out of the fuel passage along an axis into a volume as a fuel flow;
the fuel injector assembly configured to direct air out of the air passage along the axis into the volume as an air flow, the air flow circumscribing the fuel flow; and
the fuel injector assembly configured to direct steam out of the steam passage along the axis into the volume as a steam flow, the steam flow circumscribing the fuel flow and providing a radial buffer between the fuel flow and the air flow;
wherein the fuel injector assembly is configured to swirl the air within the air passage in a direction about the axis to provide the air flow; and
wherein the fuel injector assembly is configured to swirl the fuel within the fuel passage in the direction about the axis to provide the fuel flow.

* * * * *